April 21, 1942.  F. G. YANES  2,280,112

POLYCHROMATIC PAD FOR USE IN COLOR PHOTOGRAPHY

Original Filed July 15, 1937

INVENTOR.

Patented Apr. 21, 1942

2,280,112

UNITED STATES PATENT OFFICE 2,280,112

POLYCHROMATIC PAD FOR USE IN COLOR PHOTOGRAPHY

Francisco G. Yanes, New York, N. Y., assignor, by direct and mesne assignments, of thirty per cent to Tomas Pacanins, New York, N. Y., and fifteen per cent to Florencio Gomez, Trujillo City, Dominican Republic Original application July 15, 1937, Serial No. 153,696. Divided and this application November 23, 1938, Serial No. 241,986

11 Claims. (Cl. 101—149)

The invention relates to a light insensitive dry element, which may be described as a support coated with a medium in which color providing substances are incorporated, proportioned and prearranged for photographic purposes.

The invention was first the subject of an application Serial No. 153,696, filed on July 15, 1937, of which the present one is a division. In the original application the invention was given the title of Polychromatic pad to differentiate it from the Tonochromatic film, another material sensitive to light which was the subject of another application also filed on July 15, 1937, under Serial No. 153,695.

The polychromatic pad of the present invention may be considered from two different points of view according to the color photographic purposes attained. It may be used for selectively dyeing or inking part images in different processes as a substitute of coloring baths, and it may also be used as a picture foundation when the colors present in the pad are eliminated proportionally to the negative color values. In both cases the pad may render monochromatic part images or part records in which colors belonging to an end of the spectrum appear distributed among the tone values of a part image for purposes concerning special processes.

One of the purposes of the invention is to eliminate the use of dyeing baths and to provide coloring means which can supply the necessary amount of dyeing liquor at the required moment with economy, simplicity, cleanness and especially with constant results. In dye printing and in general in most coloring processes, every color requires a special solution or rather a set of solutions of different saturation, or acid or alkaline content in order to provide different degrees of contrast. The number of dyeing baths is then multiplied by the number of colors required for two, three or four color work. Then those baths must be well preserved and stored in a number of containers and also maintained in condition from evaporation or exhaustion in order to obtain constant or at least approximate results. And finally a number of contrivances as tanks, trays, spongeous devices and other color dispensers, one for each color, are necessary to provide the coloring. These circumstances are overcome when the polychromatic pad is used for dyeing purposes. The pad, in the first place is a dry material, similar to a photographic film in structure, and which can be cut to different sizes, stored in a small place, and available for use at any time. As it is not sensitive to light it keeps in good condition without special precautions and indefinitely. By carrying only the necessary amount of coloring substances for one image the pad is susceptible of rendering constant results as a new one is used every time. Such amount of coloring matter may be varied for different contrasts and for different colors and may also be chosen as to supply complementary colors, requirements which are easily controlled in the manufacture of the pad. As to the acid or alkaline content that the dyeing liquor may require it can be easily proportioned when the pad is wetted at the moment of using.

Another advantage of the pad over coloring baths is the possibility of a mass production usually limited by the number or size of tanks and trays, for any number of part images can be simultaneously colored.

Another advantage is that the pad may be produced as a double coated element having a different pigment on each side which permits a simultaneous and selective coloring of two records of different color values, simply by sandwiching between them the wetted pad, an arrangement most suitable for two color work.

Still another advantage is the cleanness of the operation when the coloring is applied by means of the pad because the pigments which are not taken by the colored image remain in the pad and there is not any running of staining solutions, an advantage which is priceless from many points of view.

Although the opportunity of finding a manner for choosing, proportioning and maintaining the standard of the coloring together with the simplification of dyeing outfit was enough to justify the chromatic pad, that idea was only the point of departure for developing my invention into a dyeing element susceptible of supplying more than one color under controllable conditions. I found that migrating colors held in superposed layers, provided there were not a great difference in their respective rate of penetration, behave as a single color and transferred in order, to the point of making feasible to give a different coloring to the light and heavy tones of a dye receptive image respectively.

Yet while investigating the possibility of introducing an element of certainty in the application of two colors, or rather a graded combination of two colors to the same image, I still found that by using the pad as a picture foundation and discharging from it the negative values it was possible to obtain a sharp image in which the proportion and distribution of said colors was controllable by varying the thickness and color saturation of the strata in a polychromatic pad.

The novel constitution and operation of the coloring pad of the invention may be easily understood by comparison with the general technique of dyeing. In the tinctorial industry, after the coloring liquid is prepared and the material to be colored immersed in the solution, the first step is to cause the pigment to move from the liquid to the material where it is deposited. According to the class of dyestuff, the material to be colored and the use for which the last is purported, some after treatments may be necessary or not to fix the color. In some instances the affinity for the dyestuff is previously created by mordanting the material and in some other cases both the deposition of the pigment and its adsorption are produced by the process of dyeing. Usually the last result is achieved by raising the temperature of the coloring bath to help the decomposition of the dye-salt whose coloring component is not soluble in the bath and becomes depostied. Such raising of temperature also changes in some instances the electrical charge of the material and creates in it a greater affinity for the reversely charged dye-ions. But whatever be the case, the dyeing process may be summarized in two steps: (1) To cause the dyeing matter to move from the dyeing liquid to the body subjected to coloring. (2) To fix the color in that body when necessary. On the other hand, the great variety of dyestuffs and their different solubility, going from those that become hydrolyzed in the cold by water alone to those which are insoluble in water and cannot be used in direct dyeing, creates another problem in the fundamental step of causing the dyeing matter to be deposited. Such problem is the rate of deposition of the pigment, for when it is too rapid amounts to a precipitate and gives patchy results, and when too slow does not satisfy practical purposes. This situation is controlled by the use of "assistants" whose function is to accelerate or to retard the rate of deposition of the pigments.

When the general technique of dyeing is applied to the coloring of photographic records the dyeing resources are somewhat reduced because the raising of temperature is not advisable. For that reason pigments known to the art have been chosen which can be easily controlled in the cold by assistants. Among these assistants some are of purely mechanical action, as inert salts or colloids added to thicken the dyeing liquor, and some others of chemical or electrical effect, among which acids and alkalis that increase or decrease the solubility of the dyestuff in the bath. When using acid or mordant-acid dyes which as a rule are readily soluble in water, a small amount of a weak acid decreases the solubility and increases the rate of deposition. Some acid dyes, however, which are not very soluble, are deposited from a neutral bath, and still some, whose solubility is still less, need a weak alkaline assistant. Basic dyes, on the other hand, act in a reverse way for they are hardly soluble in water and a small amount of acid favors their solubility in the bath and acts as a retarder. For direct dyes, which have been compared to colloidal solutions in which the pigment is suspended, the assistants are purported to increase or decrease the size of the colloidal aggregates of coloring matter, or as a physical obstacle to their rapid deposition. The viscosity of colloidal solutions commonly known and used in the tinctorial industry as a retarder for the penetration of coloring liquids is also utilized in the coloring of certain kinds of photographic records.

From the last point of view, there is a substantial difference with the pad of my invention. When starch, gelatine, glue and similar substances are utilized as protecting or retarding substances in the tinctorial industry, their effect is to increase the viscosity of the bath, as long as gelatine in a hot water solution is dissolved and acts as any other soluble colloid. When coloring certain types of photographic records in the cold, the thickening of the bath is actually performed only by means of soluble colloids. In the pad of the invention, however, as later described, a setting colloid is mixed with the coloring solution and then coated and dried. As the coating sets the coloring bath remains fluid swelling the colloid. When dry the solid components of the coloring bath are only retained by the coating; but when the pad is soaked in water for using, the original dyeing liquor is restored and held by a swollen coating which is not soluble in water and can supply the coloring by contact to a photographic record. Such achievement is possible because a jelly is utilized as a retarder and makes unnecessary the agitation of the liquor, as we shall demonstrate.

When a coloring bath is repeatedly used there are many known resources for refilling it in order to produce approximate results, but the coloring process is still too complex to expect precise and constant shades. In the case of coloring photographic records such lack of precision is particularly undesirable for colors must be obtained corresponding to a given contrast and sometimes in complementary relation with colors produced by other baths. The only manner of obtaining constant results is by using each time new and freshly prepared coloring liquids, a course involving waste, for the bulk of the liquor sometimes must be sufficient for handling lengths of film, as in cinematography. Even in a small scale the amount of solution must permit the agitation or circulation of the bath.

While experimenting in coloring photographic wash-off matrices by spreading upon the records small amounts of new coloring baths I found that acid and mordant-acid dyes were not suitable for that purpose unless the dyeing solution were agitated by moving the records or by blowing air upon them. Otherwise the coloring was uneven and marble-vein marks appeared on the image. By watching how the blowing upon the record disturbed the formation of the marble-vein marks I realized that it was a retarding action which could be substituted by another physical retarder. Thus instead of applying the small amount of coloring solution directly, I held the liquid in a gelatine layer and applied the same by contact. The result was a somewhat slower but perfectly even coloring. The idea of producing a dry pad carrying the solid components of a dyeing bath, was the practical consequence, for the amount of water that a given weight of gelatine is capable of absorbing is known, and so the concentration and dyeing-power of a pad may be also known, controlled and standardized in manufacture.

It has been suggested to apply dyeing solutions by means of spongeous bodies holding the free liquid, but outside of those dyes which may color from a standing bath, the retarding action of the agitation of the liquid will be absent and the coloring uneven. Another possible trouble when using a color dispenser of that type consists in the air bubbles caught between the sponge and the record, which cannot be eliminated by squeegeeing without the liquid running out of the sponge. In the case of the gelatine coating, on the contrary, the contact may be produced by squeegeeing and is perfect. A spongeous body imbibed in a coloring solution and dried could not be immersed in a liquid without giving away the pigments. In fact, a device of this sort is purported to apply a coloring liquid previously prepared. While the pad, itself, is a dyeing bath in dry condition, advantageously held in a container which automatically takes the necessary amount of water to later furnish the coloring matter by contact, at a convenient rate and for precise and constant results.

Besides its retarding action during the coloring process, the imbibed colloid has in regard to dyestuffs the quality of retarding also the rate of bleeding. A dry gelatine layer, for instance, carrying a crystallized water soluble salt will give away that substance when immersed in a water solution, while the same coating will take a longer time to give up a pigment and when small amounts of known assistants are added to the water the bleeding may be completely stopped. This is a favorable condition for the known assistants which may be necessary to combine with the dyestuff in a coloring pad should rather be purported to prevent the adsorption of the pigment by the gelatine which must later supply the pigment by contact to the record. The fact that the soaking solution prevents the bleeding of a substantially free pigment shows that useful property of the colloid. Thus the pigment held by the swollen coating remains in a sort of equilibrium between the colloid for which it has no affinity and the liquid in which it is less soluble. When the wet pad is applied and squeegeed on the record to be colored the migration starts and continues by diffusion, undoubtedly accelerated by the present humidity but without any running coloring bath. In this manner the first step of the coloring process is performed. As to the fixing of the color all depends upon whether the colored record is the final image or an inked matrix purported to be printed on a third element, and when necessary it may be performed in any of the ways well known to the art.

Figure 4:
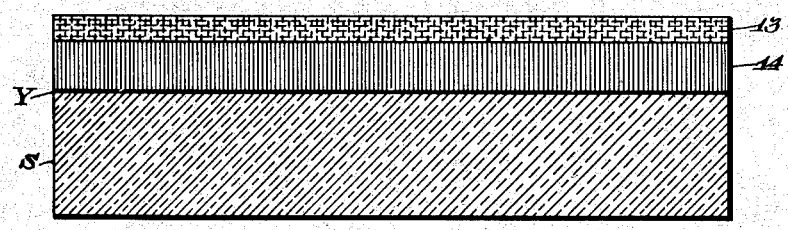

Fig. 4 presents the pad as a potential dyeing element.

Figure 1:
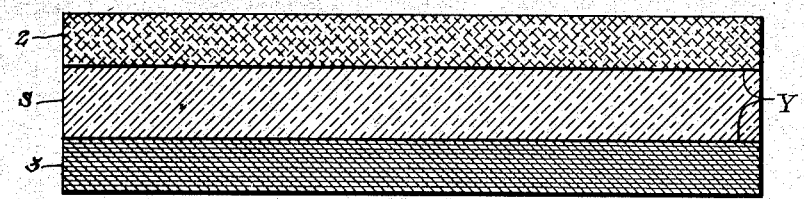
Fig. 1 illustrates a bicolor pad.

A very simple form of a bicolor pad is illustrated in Fig. 1. It comprises a support S carrying two coatings of a medium in which two migratory color-causing substances are incorporated. By "migratory" colors is understood the kind of dyestuffs which will migrate or wander into another gelatine film, a property corresponding to the solubility of the dye in water and which can be increased or controlled in most dyestuffs by the addition of "assistants" well known to the tinctorial industry.

I may produce the dyeing element in a support of Celluloid and use as a medium gelatine which is previously dyed to the desired shade and applied at ordinary emulsion coating temperature of 33° to 35° centigrade. For purposes later described hard gelatine is preferable and should the saturation of the color be too great it may be cut by adding more gelatine. The temperature should never be raised further than necessary for mixing or coating as it may affect some dyes. I usually add small amounts of glycerine to prevent the brittleness of the coating. Instead of Celluloid the support may be made of collodion, and many other suitable materials including a self supporting medium; and regarding the medium other colloids or matter fulfilling the purpose may be used. The color-causing substances are also many and may be incorporated in the medium in different manners. However, I prefer the described example, as liable to permit a controlled and standardized production in a commercial scale.

The practical advantage of the "inking" pad presented in Fig. 1, may be fully realized by considering that it is not a mere color dispenser, for complementary colors of the required shade may be chosen, proportioned and prearranged to permit the correct and simultaneous dyeing of two matrices. I do that by sandwiching between them, at moderate pressure, the color-supplying element previously soaked in water in the presence of an assistant which prevents the bleeding of the colors, as for instance, a slight amount of a weak acid for certain groups of dyestuffs. A further advantage of the dyeing element is that the colors can be proportionate for the heavy tones, and once the equilibrium of the coloring is produced for the lighter tones, the heavy ones cannot take more color than is present in the section they contact, so it is possible to control the contrast. It is evident that by proportioning the coloring substances to the weight of the gelatine they are consequently proportioned to the amount of water that the gelatine is capable of absorbing, which is a known factor, and so not only the volume but the concentration and dyeing power of the coloring liquid therein produced is known and controllable. Of course the proportionate color-causing matter in the double element in Fig. 1 can be produced in two separate supports which for mere dyeing purposes need not be made of a transparent substance and in such form they also may be used for final coloring of a transparency whose complemental values are produced on opposite sides of a double coated film carrying two absorbent images. A separate, one-image-dyeing-element, is illustrated in Fig. 4 for double-coloring.

The simultaneous "inking" of the two matrices by means of the element shown in Fig. 1, leaves this, after used, without any further application. However, this waste is avoided when the material is used as a foundation for the picture. I may produce through the photographic process instead of positive reliefs reversed or negative absorbent images which when dyed by the element will leave in this the positive color picture. And as long as said negative matrices can be washed and used again many copies can be reproduced. So the dyeing element has both the advantages of a controllable dyeing device and a sort of chromatic foundation for the production of a picture. This color foundation, as explained, is susceptible of being manufactured to fit negatives of different contrast.

Figure 2:
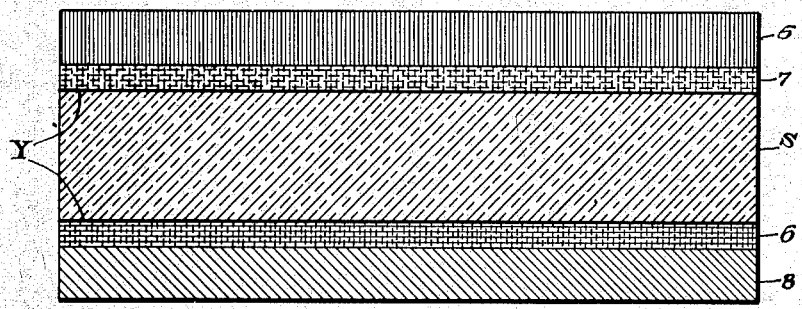
Fig. 2 is the four color tonochromatic form of the pad.
Figure 3:
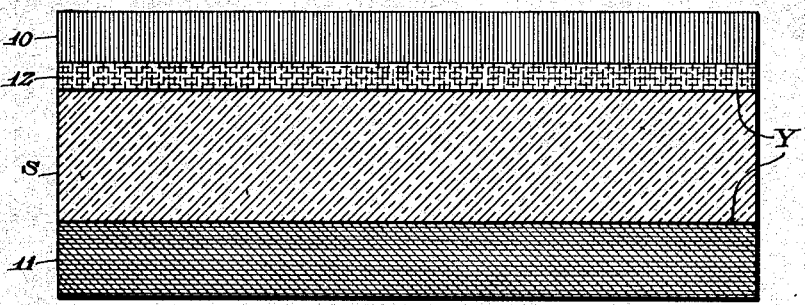
Fig. 3 shows a three color type of pad.

When the element illustrated in Fig. 1, is used as a foundation where colored pictures are produced by discharge, I may add a feature shown in Y which separates the support from the orange layer 2 and the blue-green layer 3. The same feature is shown in Figs. 2, 3 and 4. That sort of substratum which is not indispensable when the layers are thin and hardened, is a precaution to prevent any side invasion of coloring matter and preserves the sharpness of the picture. It merely consists of a hardened colorless substratum carrying a dye repellent colorless salt which as the migration takes place seems to move in the line of absorption. Although the function of this substratum is rather physical, many dyeing assistants well known in the industry can be used in a small proportion according to the class of dyestuff. Another precaution when using the element as picture foundation is to add to the soaking solution a hardening substance as 1 to 2% of formaldehyde for instance. After the discharge takes place the film must be quickly dried. As it is, the material in Fig. 1 might be used in cinematography for two-color pictures and even the amateur will be offered the easiest and most economic way of producing a color photograph. A thin sheet of the double coated material formed on a thin and flexible support may be soaked and sandwiched between the two negatives in register of a bi-pack transformed in absorbent dye-discharging images.

Although reference has been made to the co-application describing the tonochromatic film, I shall here summarize the main points of the potential polychromatic prearrangement duplicated in Fig. 2. One side of the transparent support S carries a thin yellow coating 7 and a magenta thicker layer 5; this pair transmits a strong red, but if color is discharged in depth lighter reds, oranges and yellows may be produced showing a pigmentary imitation of one end of the spectrum. The pair blue-violet 6 and green 8 on the other side if subjected to similar discharges will reproduce another complemental section of the spectrum. It can be easily understood that a negative photographic relief of gelatine, having a varied absorbing capacity according to the tones, will make proportional discharges on each side. And as the two-element analysis according to the tonochromatic system have been arranged to separate the two scales of colors and adjusted to record them in the same spectral order adopted in the material, a full color picture will be obtained.

Instead of having four strata, the pad may be built as in Fig. 3, where a single blue-green stratum 11 is opposite to the pair magenta-yellow 10—12. Or as in Fig. 1, where both pairs are represented by intermediate colors as the orange 2 and the blue-green 3.

When the pad is used for dyeing, a one side coated element may be used as shown in Fig. 4. Although it may be produced to supply one color it has been illustrated for double-coloring and the order of the strata 14—13 is reversed. Assuming that an absorbent positive image is produced on a support and put in contact with the wet dyeing element, the lighter tones will only take the yellow while the other color will be absorbed together with the yellow and proportionally by the other tones. For three and four color work, pads held in pairs on a common support as illustrated in Fig. 1, may supply two of the colors while a single supported pad may supply the third color, but whether separated or paired, every set of pads must be considered as a unit representing the polychromatic pad for the colors for each set must be proportionate for the required contrast and so balanced in regard to each other that their complementary combined absorption will produce a neutral gray.

Whether the pad be used as a dyeing element, including the inking or final coloring of photographic records, or as a picture foundation when this is produced by discharging negative values from the pad, the migration of coloring substances from the pad towards the photographic record may be produced in many ways by well known treatments. A physical phenomenon or chemical reaction or both combined, may cause mordanted, absorbent or both mordanted and absorbent records to have an affinity for coloring solutions. In regard to the relative thickness of the layers in certain types of the pad, such materialization has been adopted to show proportion, but such proportion may be realized by other means. Another point is that the migration is not an exclusive property of certain dyestuffs, for many substances susceptible of rendering a color by chemical reaction may be subjected to discharge and are equivalent to coloring substances.

In regard to the specific types of pads illustrated in the drawing they must be considered as different examples of arrangements purported to serve different processes of the prior art. In said examples a pad may have a support as in Fig. 4 and supply two colors, or it may supply one color and have a common support with another pad supplying also one color as in Fig. 1, or supplying two colors as in Fig. 3. So the pad may supply a color or two and have either an individual or common support with another pad. In pads supplying two colors the position of the layers in regard to the support, for dyeing purposes, as shown in Fig. 4, is changed into a reversed arrangement when the pad is to be used for a picture foundation by discharging the negative values, as shown in Fig. 2, though the material in both cases is the same and the migration of the pigments towards the photographic record based upon similar phenomena.

After having described to the best of my knowledge the new material I wish to be understood that the present disclosure is for the purpose of illustration only and that my invention includes any equivalents or variations which fall within the scope of the appended claims.

I claim:

1. In a two sided dyeing device susceptible of being wetted for the purpose of simultaneously coloring by contact two separate, dye-receptive photographic records, or to produce a color picture in the same device by discharging the negative values from both sides, the combination of a sheet-like transparent support and on each side of said support one insensitive to light continuous coating of substantially plain gelatine carrying in dry condition and evenly distributed actually soluble orange dye matter on one side and, on the other side, actually soluble blue-green dye matter; said dye matter of complementary color transmissions, said dye matter pertaining to the kind of migratory pigments known to wander from a film of damp gelatine into another, said dye-carrying coatings each having one face towards the respective side of the support and the other face exposed to the air, whereby it is possible to secure a direct contact between the dye carrying coatings and separate dye-receptive photographic records.

2. In a dyeing device susceptible of being wetted for the purpose of coloring by contact separate dye-receptive photographic records, the combination of a sheet-like support and on each side of said support one continuous, insensitive to light coating formed by absorbent colloidal body insoluble in plain water at normal temperature, said colloidal body in both coatings carrying in dry condition and evenly distributed actually soluble dye matter, said dye matter pertaining to the kind of migratory colors known to wander from a film of damp gelatine into another, each of said dye-carrying coatings having one face towards the respective side of the support and the other face exposed to the air.

3. In a two sided device susceptible of being wetted for the purpose of coloring by contact two separate dye-receptive photographic records or to produce in the same device a color picture by discharging the negative values from both sides, the combination of a sheet-like support having on one side two continuous insensitive to light and superposed layers of different thickness respectively formed by absorbent colloidal bodies insoluble in water at normal temperature, said layers carrying incorporated in their colloidal body and in dry condition dye matter susceptible of providing a different color in the respective layer, the color provided in one of the layers corresponding to a spectral hue and in the other layer to a second hue which when combined with the first hue in different proportions will reproduce a succession of colors belonging to one end-half of the spectrum; said support having on the other side a third single layer also insensitive to light and formed by a colloidal body carrying in dry condition dye matter of a transmission complementary to the transmission of the first pair of layers, said dye matter pertaining to the kind of migratory dyestuffs known to wander from a film of damp gelatine into another.

4. In a two sided device susceptible of being wetted for the purpose of coloring by contact two separate dye-receptive photographic records, or to produce a color picture in the same device by discharging the negative values from both sides, the combination of a sheet-like support and on one side of said support two continuous insensitive to light and superposed layers of different thickness respectively formed by absorbent colloidal bodies insoluble in water at normal temperature, said layers carrying incorporated in the corresponding colloidal body and in dry condition dyed matter of different color for each layer, the color provided in one of the layers corresponding to a spectral hue and in the other layer to a second hue which when combined with the first hue in different proportions will reproduce a succession of colors belonging to one end-half of the spectrum; said sheet-like support having on the other side two other similar layers also of different thickness and insensitive to light, said second layers respectively carrying dye matter of a different color for each layer, said dye matter in both of the layers pertaining to the kind of migratory dyestuffs known to wander from a film of damp gelatine into another, the colors in the second pair of layers complementary to the colors in the first pair of layers.

5. In a dyeing device susceptible of being wetted for the purpose of simultaneously coloring by contact with two different colors, respectively, the lighter and heavier tones of an independent dye-receptive photographic record, or to produce in the same device a duo colored picture by discharging the negative values, the combination of a support and two continuous insensitive to light and superposed layers of absorbent colloidal bodies insoluble in water at normal temperature, said layers having different thickness and carrying in dry condition dye matter of different color for each layer, the color in one of the layers corresponding to a spectral hue and in the other layer to a second hue which when combined with the first hue in different proportions will reproduce a succession of colors belonging to one end-half of the spectrum; said dye matter in each of the layers pertaining to the kind of migratory dyestuffs known to wander from a film of damp gelatine into another.

6. In a two sided coloring device susceptible of being wetted for the purpose of coloring by contact two separate dye-receptive photographic records representing complementary color values, or to produce a color picture in the same device by discharging the negative values from both sides, the combination of a transparent support and a plurality of coatings insensitive to light distributed on both sides of said support, the coatings on one side carrying in dry condition soluble coloring matter different for each layer and respectively corresponding to colors belonging to one end-half of the spectrum, and the rest of the layers on the other side also carrying in dry condition soluble dye matter corresponding to at least one color of the other end-half of the spectrum, the colors on one side of the support of a combined transmission complementary to the transmission of the rest of the layers on the other side; each of said layers being continuous, formed by absorbent colloidal bodies insoluble in water at normal temperature, and having the respective dye matter evenly distributed for an equal transmission in its whole area; said dye matter in all of the layers pertaining to the kind of migratory dyestuffs known to wander from a film of damp gelatine into another.

7. For use in the pigmenting of photographic records, a small amount of a coloring bath, sufficient to cover an area to be pigmented, said coloring bath including dye-matter and also colloidal matter known to produce retarding action and even deposition of pigments, said colloidal matter of the type which sets in a jelly and is known to swell without dissolving in water at normal temperature, said coloring bath also containing dyeing-assisting matter known to control the solubility of dye-matter and the rate of deposition of pigments, said dyeing-assisting matter corresponding to the class of dye-matter in the bath, said small amount of bath extended on a supporting sheet-like element and dried, the surface of the supporting element corresponding to the area to be pigmented.

8. A dry, insensitive to light sheet-like element, having in combination a support, and a dry coating of a permeable jelly setting colloid on said support, said colloid carrying in dry state solid components of a coloring bath including dye-matter and dyeing-assisting matter.

9. A dry, insensitive to light, sheet-like element including a permeable layer of material insoluble in water at normal temperature, said layer carrying in dry state solid components of a coloring bath including dye matter and dyeing-assisting matter.

10. For use in the pigmenting of photographic records with economy, evenness and constant results, a dyeing device including a sheet-like support carrying in dry state a layer insensitive to light and having one of its sides exposed to the air, said layer including dye matter and also colloidal matter known to produce retarding action and even deposition of pigments, the colloidal matter unmordanted to said dye matter and susceptible of absorbing cold water without dissolving; said dye-matter completely and readily soluble in water, the dye-matter further pertaining to the group of migratory colors known to wander by contact from a layer of damp colloid into another, said dye-matter chosen from the group of dyestuffs which do not bleed in an acidified water solution, the relative conditions of both the soluble dye-matter and the unmordanted colloidal-matter causing the first to remain in the second in a free state.

11. In a dyeing device susceptible of being wetted for the purpose of coloring by contact a separate dye-receptive photographic record, or to produce a picture in the same device by discharging the negative values, the combination of a sheet-like support and a coating insensitive to light on said support, this coating formed by absorbent matter insoluble in plain water at normal temperature, said coating carrying in dry condition and evenly distributed readily soluble dye-matter, said absorbent matter unmordanted and without natural affinity for said dye-matter, said coating having one face towards the support and the other exposed to the air.

F. G. YANES.